Dec. 5, 1939. G. DESAGNAT Re. 21,285

DECORATIVE WALL COVERING

Original Filed Jan. 12, 1933

G. Desagnat INVENTOR

By: Marks & Clerk Attys

Reissued Dec. 5, 1939

Re. 21,285

UNITED STATES PATENT OFFICE 21,285

DECORATIVE WALL COVERING

Gaston Desagnat, Paris, France

Original No. 1,976,986, dated October 16, 1934, Serial No. 651,436, January 12, 1933. Application for reissue October 5, 1939, Serial No. 298,064

9 Claims. (Cl. 72—23)

The present invention relates to improvements in wall covering of the general type disclosed in my prior Patent No. 1,930,740, issued October 17, 1933.

The relatively closely woven texture of the backing of swanskin or the like disclosed in said earlier issued patent, permits sufficient stretch or extension to take up minor differences in height or lack of parallelism, as for instance between floor and ceiling. It will not serve to accommodate the greater irregularities in wall structure frequently encountered in practice. Moreover the mastic by which the rear face of the backing is generally attached to the wall will not penetrate the relatively dense structure of swanskin. Nevertheless swanskin has sufficient capillarity to permit the slow spread or rise of moisture therethrough, thereby causing weakening and in time rotting of the swanskin.

It is an object of the invention to provide a decorative wall covering of the general character set forth, which will afford adequate distensibility in application thereof to the wall, to permit correct edge to edge contact of successive sections or units of the covering, even under conditions of aggravated irregularity of the wall, in which such adjustment is effected without danger of loosening any of the tiles from the backing and in which, although the backing material is of capillary character and is not subjected to any waterproofing or other treatment prior to the application to the wall, the applied product is nevertheless substantially proof against the entry of moisture, either outward from the wall or inward through the joints between the tiles of the facing.

According to the invention the backing is a textile of relatively loose mesh or texture, preferably the knitted or woven fabric known as "ribbed tricot".

Figure 1:
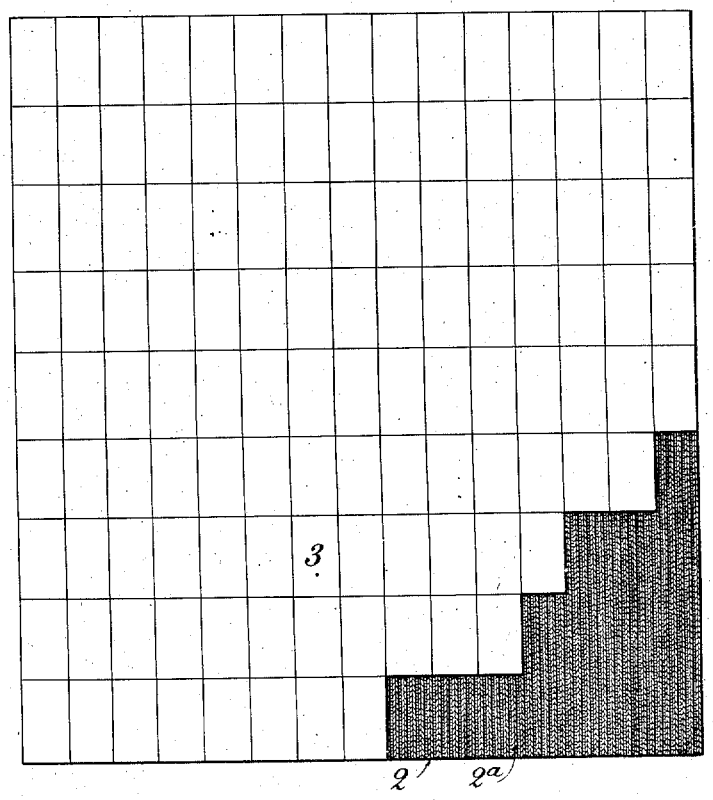
Figure 2:
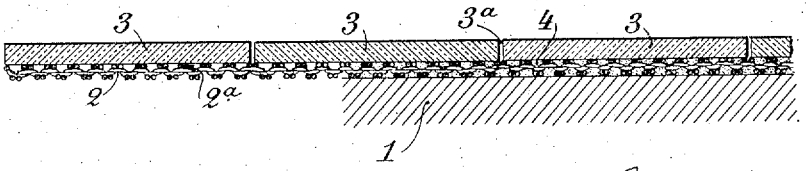

In the accompanying drawing in which is shown one of various possible embodiments of the several features of the invention, Fig. 1 is a plan view of a section or unit of wall covering according to the present invention, with certain of the tiles shown broken away to disclose the structure of the backing, and Fig. 2 is a view in transverse cross-section on a larger scale.

According to the invention there is employed a backing 2 of loose mesh or texture ribbed as at 2*a*. Preferably that knitted or loosely woven fabric is used which is known as "ribbed tricot". By reason of the relatively ample loops which make up particularly the ribbed structure of such fabric, it is freely extensible both longitudinally and transversely and is also readily compressible in thickness.

Upon the backing set forth there is glued a decorative rigid plate of corresponding dimensions made of opaline glass, for instance. Decorative material in the form of sheets or plates or in any other form may be glued under the rigid plate 3 where the latter is made of transparent glass. The plate in any of its embodiments is glued to the backing only on the ridges of the ribs 2*a* of the face of the tricot and the body of such backing beyond the ribbed structure which mounts the rigid plate remains substantially free from glue, more readily to be penetrated by the mastic used for mounting the covering upon a wall. The plate thus adhesively secured to the tricot, is then cut into a pattern of small rectangular elements or tiles 3 shown, substantially in the manner more fully described in my earlier issued patent above identified.

By reason of the fact that the individual glass tiles 3 adhere to the ribbed tricot only on the ridges of the ribs thereof, and by reason of the spacing between consecutive tiles as shown at 3*a* in Fig. 2, it will be clear that the backing may be stretched considerably, particularly at the joints between the rigid tiles. As a consequence proper adjustment of the tiles on successive sections or units is permitted for edge to edge contact thereof, and this even under extreme conditions of irregular waviness of the wall structure. This circumstance also permits convenient use of the covering material for surfaces with considerable curvature, both convex and concave.

In the application of the covering to the wall with a suitable mastic, the act of pressing against the wall the covering material that has been positioned as just set forth, results in mastic permeating the entire loose texture of the tricot backing and excess mastic moreover exudes through the joints 4 between successive tiles. As a consequence the backing material becomes water-proofed by the mastic and the exposed face of the covering becomes caulked by the mastic which fills the joints between the tiles. Were it attempted to fill the joints or spaces with plastic material from the exterior, the extra operation would not only add expense, but the caulking would be less effective. The caulking of my invention has a two-fold advantage. On the one hand it contributes to rendering the covering smooth and impervious and prevents moisture from stagnating in the joints 4; on the other hand it constitutes a binding between the small plates or tiles 3, holding these plates perfectly in position and enhancing the strength of the wall covering structure. It is understood that the mastic or other adhesive may be of suitable color for producing varied decorative effects.

Having thus described my invention, what I claim as new and desire to secure by Letters Patent is:

1. A decorative covering adapted to be directly secured upon a wall by means of an adhesive, comprising a rigid decorative plate, such as a glass sheet, glued on a support constituted by a sheet of flexible material, extensible and compressible in any direction, having a texture sufficiently loose to be impregnated throughout its thickness by the adhesive serving to secure it upon the wall.

2. A decorative covering for walls, comprising the combination of a decorative rigid plate, such as a glass sheet, and of a sheet of flexible, extensible and compressible material united by gluing, the said sheet of flexible material being adapted to be glued upon a wall and being sufficiently loose to be completely impregnated by the glue used for the purpose.

3. A decorative covering adapted to be directly secured upon a wall by means of an adhesive, comprising a rigid decorative plate, such as a glass sheet, glued on a support constituted by a sheet of flexible material, extensible and compressible in any direction, having a texture sufficiently loose to be impregnated throughout its thickness by the adhesive serving to secure it upon the wall, the said rigid plate being cut out in small elements.

4. A decorative wall covering comprising a backing support of ribbed textile fabric and a decorative facing made of rigid material glued to the face of said fabric, said fabric having a texture sufficiently loose to be impregnated throughout its thickness by mastic used to secure it upon a wall.

5. A decorative wall covering comprising a backing support of ribbed textile fabric, a plate of rigid decorative material glued upon the backing fabric at the ridges of the ribbed structure thereof, said backing material being substantially free from glue throughout the body thereof beyond the ribbed structure mounting said plate and having a texture sufficiently loose to be impregnated throughout its thickness by the mastic or the like used to secure it upon the wall.

6. A decorative wall covering comprising a backing of ribbed tricot, a covering comprising a multiplicity of rigid decorative tiles adhesively secured in slightly spaced relation at the ridges of the ribs of said tricot backing, said tricot being extensible longitudinally and transversely and compressible in thickness and having a relatively loose texture, thereby to become impregnated with the mastic or the like used in affixing the covering upon a wall structure.

7. A decoratively covered wall structure comprising a pattern of rigid decorative tiles covering the wall area, said tiles being slightly spaced from each other, a backing of textile fabric upon the face of which said tiles are glued, the fabric of said backing being extensible longitudinally and transversely and also compressible in thickness, and mastic or the like bonding the said backing to the wall, the fabric of said backing having a texture sufficiently loose to be impregnated by said mastic which substantially completely impregnates the same, said mastic also extending outward from between the spaced edges of neighboring tiles, thereby caulking the corresponding gaps and protecting the structure of the backing from moisture.

8. The method of applying to a wall a covering of the type comprising a pattern of decorative tiles in spaced relation upon a backing of textile fabric of relatively loose texture, which consists in interposing mastic between the backing and the wall and pressing the covering against the wall, thereby to cause mastic to impregnate the fabric and excess to exude therethrough into and through the gaps between the tiles, whereby the mastic serves as caulking and as a bond between successive tiles.

9. The method of applying to a wall a covering of the type comprising a pattern of rigid decorative tiles in spaced relation upon a backing of textile fabric of relatively loose texture that is extensible longitudinally and transversely and also compressible in thickness, which comprises interposing a layer of mastic between the wall and the backing, drawing out the fabric for proper juxtaposition of the edges of the tile thereon with respect to the contiguous wall covering structure, and pressing the covering against the wall, thereby to cause mastic to impregnate and waterproof the fabric and excess thereof to exude through the gaps between the tiles, whereby such excess mastic serves as caulking and as a bond between said tiles.

GASTON DESAGNAT.